United States Patent [19]
Kis

[11] Patent Number: 6,098,682
[45] Date of Patent: Aug. 8, 2000

[54] TIRE PRESSURE CONTROL SYSTEM

[75] Inventor: Janos Kis, Mannheim, Germany

[73] Assignee: Deere & Company, Moline, Ill.

[21] Appl. No.: 09/236,156

[22] Filed: Jan. 22, 1999

[30] Foreign Application Priority Data

Feb. 4, 1998 [DE] Germany ............................ 198 04 249

[51] Int. Cl.⁷ .................................................. B60C 23/10
[52] U.S. Cl. ........................................ 152/415; 137/224
[58] Field of Search .................................. 152/415, 416, 152/417; 137/224, 226

[56] References Cited

U.S. PATENT DOCUMENTS

| | | | |
|---|---|---|---|
| 4,583,566 | 4/1986 | Kalavitz et al. ........................ | 137/224 |
| 4,744,399 | 5/1988 | Magnuson et al. . | |
| 4,782,879 | 11/1988 | Le Chatelier et al. ................ | 152/417 |
| 5,253,687 | 10/1993 | Beverly et al. ........................ | 137/224 |
| 5,263,524 | 11/1993 | Boardman ............................. | 152/416 |
| 5,313,995 | 5/1994 | Schultz .................................. | 152/416 |
| 5,327,346 | 7/1994 | Goodell ................................. | 152/416 |
| 5,647,927 | 7/1997 | Mason ................................... | 152/415 |
| 5,674,332 | 10/1997 | Battocchio . | |

FOREIGN PATENT DOCUMENTS

| | | | |
|---|---|---|---|
| 0 164 917 | of 0000 | European Pat. Off. . | |
| 1 247 604 | 10/1960 | France . | |
| 1292651 | 6/1961 | France .................................. | 152/416 |
| 31 05 037 | of 0000 | Germany . | |
| 693 03 695 | of 0000 | Germany . | |
| OS-38 36 105 | of 0000 | Germany . | |
| 3405111 | 8/1985 | Germany ............................. | 152/417 |
| 486356 | 10/1951 | Italy ..................................... | 152/417 |
| 2193172 | 2/1988 | United Kingdom .................. | 152/417 |

OTHER PUBLICATIONS

German Office Action dated Sep. 22, 1998.

*Primary Examiner*—S. Joseph Morano
*Assistant Examiner*—Long Bao Nguyen

[57] ABSTRACT

A tire pressure control system and method includes a pneumatic control unit, a pressure sensor, a rotary seal associated the tire and a wheel valve rotating with the tire. The system is connected to a compressed air source and the control unit is connected through a connecting line and the rotary seal with the wheel valve. The position of the wheel valve is a function of the pressure in the connecting line. To inflate and vent a tire and to reduce the number of components, the wheel valve has a closed position, an open position wherein a connection is established between the control unit and the tire, and a venting position that opens to the atmosphere. The wheel valve is maintained in its open position as long as an inflation pressure exists in the connecting line. The wheel valve moves into its venting position as long as the pressure in the connecting line that exceeds the inflation pressure by at least a pre-determined value. The wheel valve moves into its closed position when a closing pressure exists in the connecting line which is less than the inflation pressure by at least a pre-determined pressure difference.

13 Claims, 2 Drawing Sheets

TIRE PRESSURE CONTROL SYSTEM

BACKGROUND OF THE INVENTION

This invention relates to a tire pressure control system and method, and more particularly, to such a system which includes a pneumatic control unit, a pressure sensor, a rotary seal associated with a tire and a wheel valve rotating with the tire which can be moved into various positions. The system is connected to a source of air pressure. The control unit is connected through a connecting line and the rotary seal is connected to the wheel valve, each of whose positions is a function of the pressure level in the connecting line.

Tire pressure is regulated in agricultural vehicles such as, tractors, to conform to the particular operating condition of the moment. Tractors are increasing in power capability and in total weight. In order to reduce undesirable compacting of the ground, systems for regulating tire pressure can reduce tire pressure during field operation in contrast to the pressure during operation over the road.

EP-B1-0 164 917 shows a central tire inflating system with control devices and a wheel valve. The control devices supply an input pressure for a first connection of a pressure reducing valve. The pressure reducing valve contains a second connection that opens to the atmosphere and a third connection that is connected over a connecting line and a rotary seal with a tire valve rotating with the tire. The first connection and the third connection of the pressure reducing valve are connected to each other when the input pressure exceeds the pressure at the third connection. The third connection is connected to the venting connection when the pressure at the third connection exceeds the input pressure. The wheel valve is connected with a tire that can be inflated. It makes a open possible when a pressure is applied to its input side that exceeds a first reference pressure and when the pressure in the tire lies above a minimum wheel reference pressure. The tire is vented through the pressure relief valve that is located ahead of the rotary seal. For this purpose the system must be pressurized with a venting pressure so that the wheel valve takes on its open position. This venting pressure opposes the actual venting of the pressure chamber which hinders the venting process. Beyond that the venting connection located far ahead of the pressure chamber slows and hinders the venting process.

DE-OS-38 36 105 shows a tire pressure regulating installation for off-road motor vehicles consisting of a stationary valve combination, a rotary seal per wheel for a pressurized air supply line as well as for a control line and a valve combination for each wheel rotating with the wheel. The stationary valve combination includes a relay valve, at least one pilot valve and a closing pressure control valve. The valve combination rotating with the wheel includes a wheel control valve which is opened by a pressure impulse from the supply line and is closed by the control pressure in the control line, and a quick release valve located ahead of it which is used for the venting of the tire pressure. A check valve may follow the venting opening of the quick release valve. In this configuration the control line as well as the supply line must be connected through a rotary seal with the wheel control valve. This is costly and expensive.

SUMMARY OF THE INVENTION

An object of the present invention is to provide a tire pressure control system which has a simple configuration and which can quickly vent a tire.

This and other objects of this invention are achieved by a tire pressure control system which includes a pneumatic control unit, a pressure sensor, a rotary seal and a wheel valve rotating with the wheel with various positions. The system is connected with a compressed air source and the control unit is connected through a connecting line and the rotary seal with the wheel valve whose position at the moment is a function of the pressure level in the connecting line. The wheel valve is provided with at least one closed position, an open position as well as a venting position that opens to the surrounding atmosphere. The wheel valve occupies its open position as long as an inflating pressure exists in the connecting line. The valve is in its venting position as long as a pressure exists in the connecting line that exceeds the inflating pressure at least by a pre-determined value, and it is in its closed position as long as a closing pressure exists in the connecting line which lies below the inflating pressure by at least a pre-determined pressure difference. Here the venting is performed directly at the wheel, which reduces the time required for venting. Only one line must be taken through the rotary seal since the control of the wheel valve is performed exclusively by the pressure in the connecting line and not by an additional control line.

This system permits a rapid modification of the limit values to accommodate changes of tires and load. It offers advantages, in particular, if the tire pressure is changed frequently in order to regulate it optimally and smoothly according to the specifications of the tire manufacturer as a function of the operating conditions, the wheel load and the actual operating speed. The actual tire pressure limit values can be established upon a change of tires either by the operator or through an appropriate transponder built into the tire. The actual load on the tire can be determined by the spring deflection of the vehicle.

If the pressure is to be regulated on several tires of the vehicle, these tires are preferably connected with a common stationary pneumatic control unit. This permits a reduction in the number of components. The pneumatic control unit is preferably a modular valve block.

The stationary pneumatic control unit may also be used to regulate not only the pressure of the tires of a vehicle but also the pressure of the tires of one or more implements or trailers connected to the vehicle.

It is advantageous to attach the pneumatic control unit as a stationary device to the vehicle. Thereby a regulation of the pressure can be performed at any time without the need for employing an external control installation. A pneumatic control installation attached to the vehicle can be applied to great advantage for the regulation of the pressure of a trailer or an implement connected to the vehicle. During the attachment of a trailer or a change of trailers only the particular lines need to be connected and no additional costly modification work is required.

Preferably, the wheel valve is a spool valve. The spool valve is brought into each of its positions as a function of the pressure in the connecting line. Spool valves are simple in configuration and are not sensitive to flow rate. They are frequently used and are therefore cost effective. The wheel valve is loaded by a spring which opposes the air pressure in the connecting line controlling the wheel valve. The design of the spring permits the definition of the selector pressure points of the various valve positions.

It is advantageous that the tires of at least one axle of the vehicle and/or of an attached implement or a trailer are connected in each case through associated wheel valves and rotary seals with only one connecting line associated with the axle. The connecting line can be connected through an associated selector valve with a pressure level line of the pneumatic control unit. In this configuration the regulation of the pressure in the tires of one axle is performed together, so that the same pressure is applied in all tires on one axle. This is advantageous since the tires of one axle are usually subject to the same loads. Beyond that the number of individual components forming the pneumatic control unit is reduced.

It is appropriate that the pneumatic control unit contain at least one high pressure valve and one medium pressure valve that are arranged in parallel lines between the compressed air source and a pressure level line and that can each be switched between a blocking position and a open position. In the line of the medium pressure valve a pressure reducing valve is arranged, which regulates the inflation pressure. The pressure regulated by the pressure reducing valve is higher than the maximum required inflation pressure of the tires, however, it is lower than the pressure required to bring the wheel valve into its venting position. As long as the pressure level line is connected with the connecting line, the wheel valve occupies its venting position if the high pressure valve is open. It occupies its open position when the medium pressure valve is open, and the wheel valve is loaded by the pressure diminished by the pressure reducing valve.

To make possible a remote regulation and remote monitoring of the systems from the operator's cab of a vehicle, the selector valves and/or the high pressure valve and/or the medium pressure valve are electromagnetic valves which are controlled through an electronic unit.

When they are not energized the selector valves and/or the high pressure valve and/or the medium pressure valve preferably occupy their blocking position. In the selector valves the blocking position preferably corresponds simultaneously to the venting position for the connecting line. Thereby the wheel valve is in its closed position when the electromagnetic valves are deenergized, so that during a failure of the power supply the tires are not vented. The data detected by a pressure sensor in the pressure level line are preferably processed by an electric or electronic unit. Thereby it is possible that the electric or electronic unit automatically performs a venting or inflating process necessary to reach a pre-selected or a required pressure.

An electric or electronic control unit can bring the wheel valve into the particular desired position for venting or inflating or into the closed position. Beyond that the electric or electronic unit permits monitoring and a test of the wheel valve. It permits a controlled pressure regulation and pressure monitoring of several wheel valves.

With this system the inflation pressure is briefly applied to the tire valve in order to bring the wheel valve into its open position. Thereupon the value of the actual pressure in the tire in the connecting line is measured. A duration of inflation is determined from a comparison between the value of the actual pressure and a target pressure value that can be predetermined. Following this the inflation pressure or the venting pressure is applied to the wheel valve for the time interval determined, in order to perform an inflation or venting of the tire. This process makes possible a precise and rapid regulation of the tire pressure.

Preferably, these process steps are repeated until the target pressure value lies within a pre-determined tolerance band, whereby an iterative approach to the required pressure occurs. The performance of the process described can be improved by the application of an electronic unit. In the electronic unit an initial pre-determined functional relationship of actual/target value difference and the duration of inflation or of venting is stored in memory. This reproduces the flow relationships or the parameters of the system. The functional relationship is varied considering the initial actual/target difference and the sum of the individual durations of inflation or of venting in order to make it conform to the true relationships such as, in particular, the actual flow characteristics and tire parameters. These process steps assure that the system conforms to changes in the flow characteristics and the tire parameters. It is also possible to determine and regulate the tire pressure depending on the varying road conditions, wheel load and speed.

DESCRIPTION OF THE PREFERRED EMBODIMENT

Figure 1:
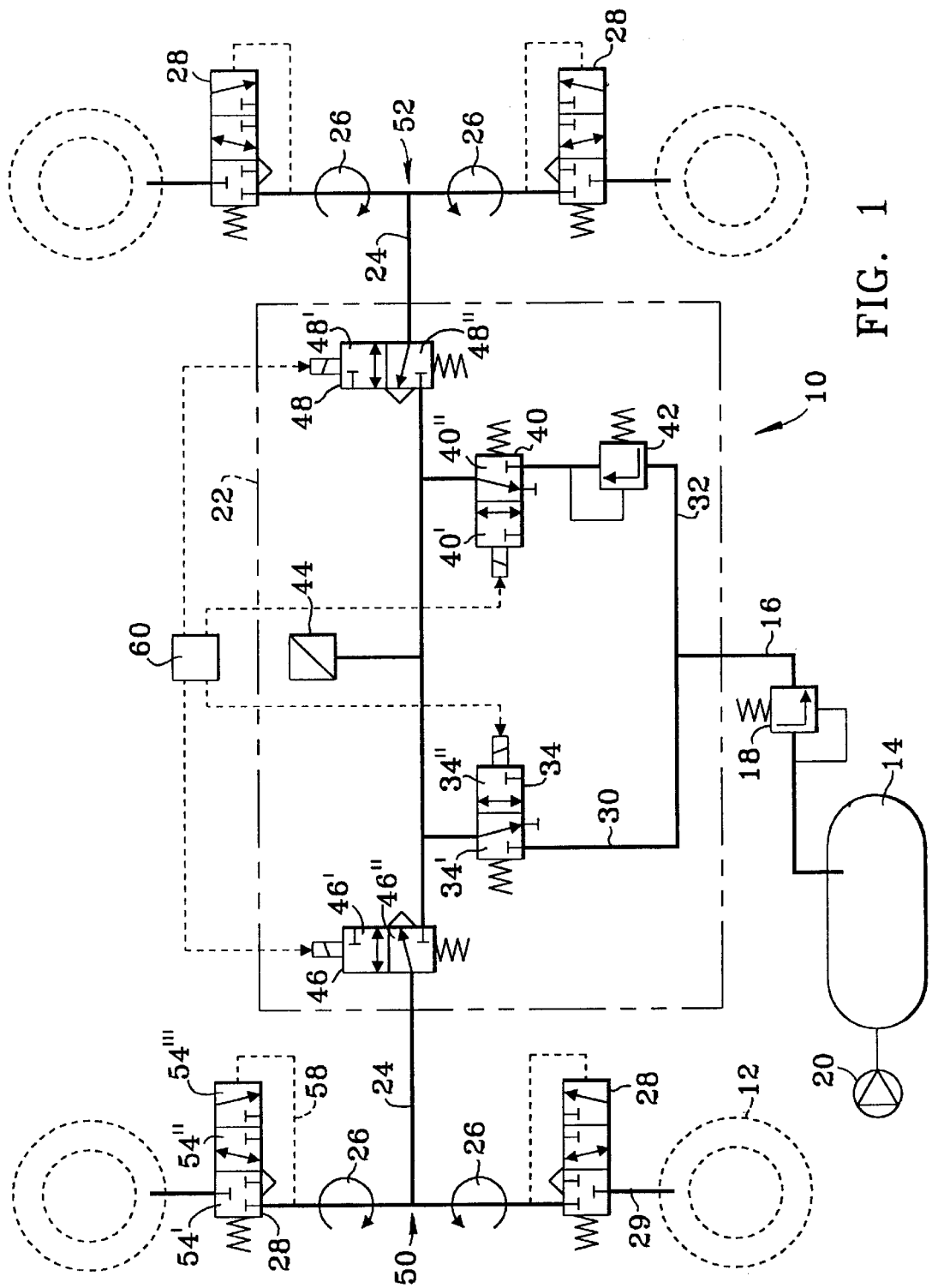
FIG. 1 is a schematic diagram of a tire pressure control system according to the present invention.

A vehicle (not shown), such as an agricultural tractor, is equipped with an system 10 for the regulation of the pressure in its tires 12, 13. As shown in FIG. 1, the system 10 includes a pneumatic control unit 22 that is connected with the four tires 12, 13 through connecting lines 24. Each tire 12 is associated with a rotary seal 26 which connects the connecting line 24 with a wheel valve 28 that rotates with the wheel. Each wheel valve 28 is connected through a connecting line 29 with the interior of the associated tire 12, 13. The system is connected with a reservoir 14 through a supply line 16 in which a discharge valve 18 is provided. The reservoir 14 is supplied with pressurized air by a compressed air source 20, such as a compressor that supplies priority pressure to the air brake system.

The pneumatic control unit 22 is attached to the vehicle and is stationary with respect to the vehicle. The supply line 16 from the reservoir 14 divides in the control unit 22 into two lines 30, 32. The first line 30 contains a high pressure valve 34 in the form of a spring-loaded electromagnetic valve with an open position 34' and a closed position 34". The second line 32 includes a medium pressure electromagnetic valve 40, with an open position 40' and a closed position 40". Line 32 also includes a pressure reducing valve 42 upstream of valve 40. Following the high pressure valve 34 and the medium pressure valve 40, the two lines 30, 32 are combined in a pressure level line 25. The pressure level line 25 is connected with a pressure sensor 44.

The pressure level line 25 is connected to two identical selector valves 46, 48 configured as spring-loaded electromagnetic valves, each having an open position 46' and 48' and a venting position 46" and 48". The other port of each selector valves 46, 48 is connected to a corresponding connecting line 24, both connected to the tires 12 via wheel valves 28. In its venting position, the selector valve opens the connecting line 24 to the atmosphere, and there is no pressure in the connecting line 24, and hence there is less stress on this line. When there is no pressure in the connecting line 24 the wheel valve 28 closes so that no pressure is bled from the tire through the wheel valve 28. Simultaneously, the pressure level line 25 is blocked so that its pressure is maintained. In the open position the connecting line 24 is connected with the pressure level line 25. The selector valves 46, 48 are located between the pressure level line 25 and the connecting line 24. The selector valves 46, 48 can be switched between their venting and open positions.

The wheel valve 28 is configured as a spool valve with a closed position 54', an open position 54" and a venting position 54'". A spring 56 at one end of the spool urges the spool of the wheel valve 28 towards its closed position 54'. At its other end the spool is exposed to the pressure in a control line 58, which is connected with the connecting line 24. Corresponding to the pressure level provided by the control unit 22 in the connecting line 24, the wheel valve 28 takes on one of its three positions 54', 54", 54'". The pneumatic control unit 22 is connected to an electronic unit 60 that controls the selector valves 46, 48, the medium pressure valve 40, the high pressure valve 34 and evaluates the measured values of the pressure sensor 44.

OPERATION

The discharge valve 18 in the supply line 16 opens only when a predetermined minimum pressure exists in the reservoir 14. This assures that pressurized air flows out of the reservoir 14 only when the pressure is above the minimum pressure required to supply a compressed air brake system. In order to determine whether the reservoir 14 contains the pressure required for the operation of the system the high pressure valve 34 can be opened. Thereby the reservoir 14 is connected with the pressure sensor 44. The pressure sensor 44 transmits the data determined to the electronic unit 60 in order to prevent an inflation process if sufficient air pressure is not available.

To inflate the tires the medium pressure valve 40 is moved to its open position 38 by the electronic unit 60. Furthermore, the selector valve 46 is moved to its open position 46' for the inflation of the tires 12 of the front axle 50 or the selector valve 48 is brought into its open position 48' for the inflation of the tires 13 of the rear axle 52, or both selector valves 46, 48 are brought into their open position 46', 48'. Since the pressure reducing valve 42 is arranged ahead of the medium pressure valve 40, the connecting line 24 carries an inflation pressure that is reduced from the pressure in the reservoir 14. This reduced pressure is applied over the connecting line 24 and the control line 58 to the spool of the wheel control valve 28 whereupon the wheel control valve 28 moves into its open position 54" and the tire 12, 13 is inflated. In order to vent the tires 12, 13 the medium pressure valve 40 is closed and the selector valve 46 and/or the selector valve 48 in each case is brought into its open position 46' or 48'. The operating pressure of the reservoir 14 here controls the wheel valve 28 directly and brings it into its venting position 54'". The interior of the tires 12, 13 is thereby vented directly to the atmosphere without the venting being opposed by a control pressure or having to travel through long connecting paths.

If the tire 12, 13 is to be neither inflated nor vented, then all electromagnetic valves 34, 40, 46, 48 are de-energized and are thereby closed. In this position the selector valves 46, 48 open the connecting line 24 to the surrounding atmosphere, so that no pressure is applied to the spool of the wheel control valve 28 and it moves into its closed position 54', in which the connecting line 29 is closed.

In order to regulate the tire pressure a brief inflation process is first performed so as to bring the tire valves 28 into their open positions 54". Thereupon the electromagnetic valve 40 is closed and the pressure sensor 44 is connected to the pressure existing in the connecting line 24, which corresponds to the pressure in the tire 12, 13.

Between the inflation, venting or measurement processes the selector valves 46 or 48 are in their venting position 46" or 48", whereby the connecting line 24 is connected with the surrounding atmosphere and thereby the region of the rotary seals 26 is no longer loaded with pressure.

Figure 2:
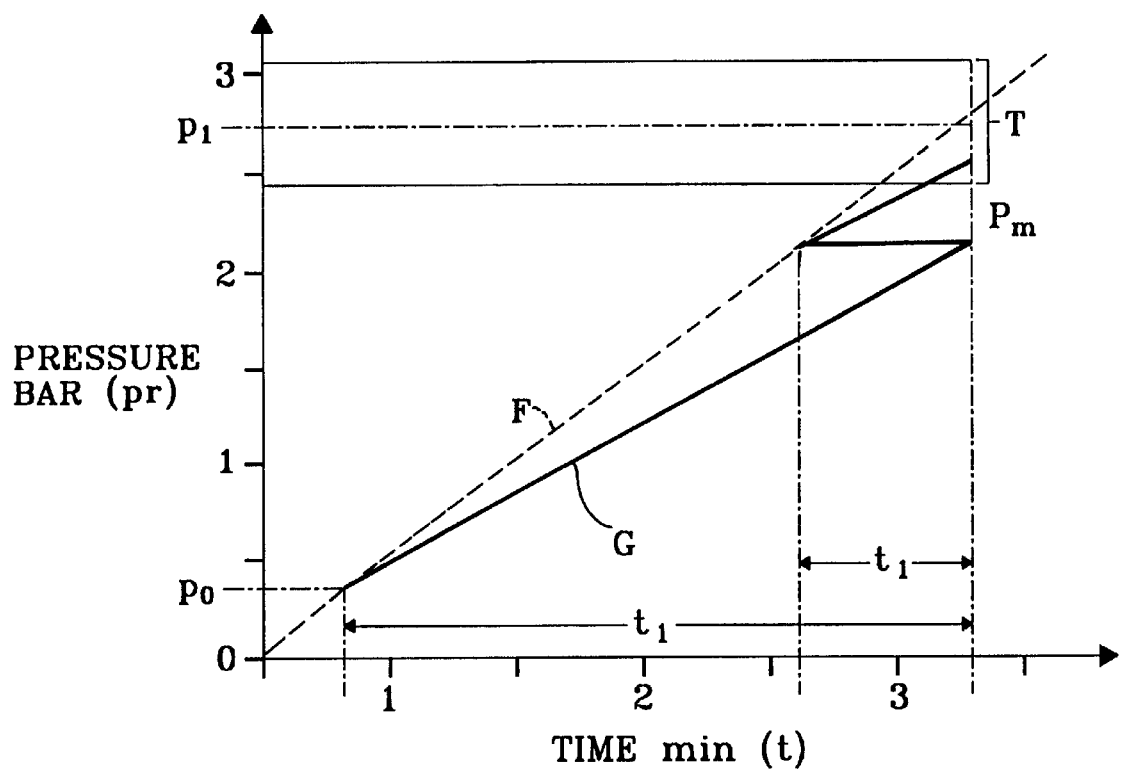
FIG. 2 is a diagram to which illustrates the operation or process of regulating the pressure of a tire.

Referring to FIG. 2, the control system operates as follows. At certain points in time that are determined either by the electronic control unit 60 or manually, for example, by the operator of the vehicle, a tire pressure regulation process is initiated. First, the inflation pressure is briefly applied to the tire valve 28 (opening of the valves 40 and 46 or 48). Then, the pressure of both tires, P0, is sensed in the connecting line 24 by the pressure sensor 44. From this sensed tire pressure, P0, the electronic unit 60 determines whether a tire pressure regulation is necessary by comparing the sensed tire pressure to a pre-determined or desired tire pressure P1. If the sensed pressure P0 differs from the desired pressure P1, then the electronic unit 60 determines a time interval t1 for a required inflation or venting process. The inflation pressure or the venting pressure is applied by a corresponding control of the electromagnetic valves 34, 40, 46, 48 for the time interval t1 to the wheel valve 28 so that the tires inflate or vent accordingly. After the inflation or venting time interval t1 has expired, the tire pressure reaches pressure Pm and this pressure is sensed. If the new sensed pressure Pm still does not match the desired pressure P1, then the process is repeated. This is continued until the desired pressure P1 has been reached. Through this process an iterative approach is made to the desired pressure P1. This process can be terminated if the sensed pressure is within a tolerance band T of the desired pressure. This process can also be terminated if a certain number of inflation or venting cycles have been performed, in which case the process is terminated if a tire is defective and the desired pressure P1 cannot be attained.

The process steps described are controlled by the electronic unit 60. The unit 60 stores in memory an initial theoretical functional relationship, represented in FIG. 2 by line F, between the time duration of inflation or venting and the difference between the sensed and desired tire pressure. On the basis of this stored relationship, the regulation of iteration of the duration of inflation and/or of venting is performed. When the tire pressure reaches the tolerance band T, then the process of inflation or venting is terminated. From the durations of inflation or venting the electronic unit 60 determines an actual functional relationship G which is stored in memory and which is used to control later inflation and venting processes. In this way the process is made to conform to the actual flow conditions in the system.

In the embodiment shown the two tires 12 of the front axle 50 or the two tires 13 of the rear axle 52 are each regulated in common. It is also possible to regulate each tire 12, 13 individually or the tires 12, 13 of the entire vehicle together. It is also possible to include the tires (not shown) of a trailer (not shown) in the system. Here it is possible to regulate the tires of the trailer, for example, individually, in pairs or in combination with the tires 12 of the vehicle.

Although the invention has been described in terms of only one embodiment, anyone skilled in the art will perceive many varied alternatives, modifications and variations in the light of the foregoing description as well as the drawing, all of which fall under the present invention.

I claim:

1. A vehicle tire pressure control system having a pneumatic control unit, a pressure sensor, a rotary seal associated with the tire, a wheel valve having a plurality of functional positions and being connected to and rotating with the tire, an inlet connected with a compressed air source, the control unit being connected through a connecting line and the rotary seal to the wheel valve, and the functional position of the wheel valve being controlled as a function of a pressure level in the connecting line, the wheel valve functional positions including a closed position, a open position connecting the control unit with the tire, and a venting position which opens the tire to atmosphere, the wheel valve occupying its open position as long as an inflation pressure exists in the connecting line, the wheel valve occupying its venting position as long as a venting pressure exists in the connecting line which exceeds the inflation pressure by a pre-determined amount, the wheel valve occupying its closed position as long as a closing pressure exists in the connecting line which is less than the inflation pressure by at least a pre-determined pressure difference, characterized by:

a pressure level line;

first and second parallel pressure lines between the compressed air source and the pressure level line;

a high pressure valve in the first pressure line;

a medium pressure valve in the second pressure line, the high pressure valve and the medium pressure valve each being switchable between a closed position and an open position; and a pressure reducing valve in the second pressure line for regulating an inflation pressure.

2. The control system of claim 1, wherein:

the pneumatic control unit is connected with a plurality of tires, wherein each of said tires is associated with its own rotary seal and a wheel valve.

3. The control system of claim 1, wherein:

the pneumatic control unit is attached to the vehicle and fixed with respect to the vehicle.

4. The control system of claim 1, wherein:

the wheel valve comprises a spool valve with a movable valve spool therein.

5. The control system of claim 1, wherein:

the wheel valve includes a spring which acts upon one end of the spool and which opposes pressure in the connecting line which acts on another end of the spool, the spring defining selector pressure values for various valve positions.

6. The control system of one of the claim 1, wherein:

the pneumatic control unit includes a selector valve, the selector valve having a venting position which opens the connecting line to atmosphere.

7. The control system of one of the claim 1, wherein the pneumatic control unit comprises:

a selector valve located between the pressure level line and the connecting line, the selector valve being switchable between a venting position wherein the connecting line is vented to atmosphere and the pressure level line is blocked, and a open position wherein the connecting line is connected with the pressure level line.

8. The control system of claim 1, further comprising:

a group of tires are associated with an axle, each tire of said group is connected through an associated wheel valve and rotary seal with a connecting line for said group, and a selector valve controls communication between the connecting line and the pressure level line.

9. The control system of claim 8, wherein:

the selector valve is comprised of an electromagnetic valve which can be controlled by an electronic unit.

10. The control system of claim 1, wherein:

the selector valve moves to a closed position when it is de-energized.

11. The control system of claim 1, wherein:

at least one of the high pressure and medium pressure valves is comprised of an electromagnetic valve which can be controlled by an electronic unit.

12. The control system of claim 11, wherein:

the high pressure valve and the medium pressure valve move to closed positions when they are de-energized.

13. The control system of claim 7, wherein:

a pressure sensor is connected to the pressure level line and transmits a pressure signal to an electronic unit, the electronic unit controlling the pneumatic control unit as a function of the sensed pressure.

* * * * *